US012178763B1

(12) United States Patent
Cohen

(10) Patent No.: US 12,178,763 B1
(45) Date of Patent: Dec. 31, 2024

(54) INDOOR OUTDOOR URN

(71) Applicant: Lindsie Cohen, Skokie, IL (US)

(72) Inventor: Lindsie Cohen, Skokie, IL (US)

( * ) Notice: Subject to any disclaimer, the term of this patent is extended or adjusted under 35 U.S.C. 154(b) by 64 days.

(21) Appl. No.: 17/962,817

(22) Filed: Oct. 10, 2022

(51) Int. Cl.
*A61G 17/08* (2006.01)
*E04H 13/00* (2006.01)

(52) U.S. Cl.
CPC ........... *A61G 17/08* (2013.01); *E04H 13/008* (2013.01)

(58) Field of Classification Search
CPC ...... A61G 17/08; E04H 13/003; E04H 13/008
USPC ................................ 211/85.27; D99/5; 27/1
See application file for complete search history.

(56) References Cited

U.S. PATENT DOCUMENTS 232,782 A * 9/1880 Townsend ............ A61G 17/007 428/34.1
2,235,617 A * 3/1941 Klinzing ................ A61G 17/08 27/1
2,385,520 A * 9/1945 Klinzing ............ A61G 17/0076 27/1
2,562,726 A * 7/1951 MacDonald .......... E04H 13/006 215/12.2
5,094,032 A 3/1992 Bayland et al.
5,172,457 A * 12/1992 Allen ..................... A61G 17/08 27/1
5,379,499 A * 1/1995 Jackson ................. A61G 17/08 27/35
5,647,108 A * 7/1997 Crook ................... E04H 13/006 27/DIG. 1
6,237,881 B1 5/2001 Levesque
6,295,705 B1 * 10/2001 Gersten .................. A61G 17/08 220/4.27
6,584,658 B2 * 7/2003 Robinson ............... A61G 17/08 27/1
6,988,299 B1 * 1/2006 Barrette ................. A61G 17/08 27/1
7,191,498 B2 * 3/2007 Fischer ................ A61G 17/007 27/1
7,232,275 B2 6/2007 Skalka
7,703,185 B2 * 4/2010 Trail ..................... E04H 13/003 52/103
D636,965 S * 4/2011 Stiles ............................. D99/17
8,234,762 B2 * 8/2012 Larbrisseau ............ G09F 19/00 211/85.27
D711,064 S * 8/2014 Miller .................... A61G 17/08 D99/18
D714,014 S * 9/2014 Miles, Sr. ........................ D99/5
8,943,762 B2 * 2/2015 Carlson ................. E04H 13/008 27/DIG. 1
9,155,673 B2 10/2015 Bailey
(Continued)

FOREIGN PATENT DOCUMENTS

CA 2255252 A1 * 6/2000 ............. A61G 17/08

*Primary Examiner* — William L Miller
(74) *Attorney, Agent, or Firm* — Cramer Patent & Design PLLC; Aaron R. Cramer

(57) ABSTRACT

An indoor and/or outdoor urn may comprise an urn and a base. The urn may be permanently coupled to the base. The indoor outdoor urn may be adapted to function as a memorial for a deceased person. The urn may be adapted to hold cremains of the deceased person. The urn and the base may be displayed at an indoor venue with the base serving as a display stand for the urn. The urn and the base may be displayed at an outdoor venue with the base buried in the ground to serve as a footing for the urn.

12 Claims, 4 Drawing Sheets

(56) References Cited

U.S. PATENT DOCUMENTS

| | | | | |
|---|---|---|---|---|
| 8,943,657 | B1 | 12/2015 | Perry et al. | |
| 9,233,045 | B2 | 1/2016 | Lynch | |
| 9,441,393 | B1 * | 9/2016 | Muthusami | E04H 13/001 |
| 9,872,441 | B1 | 1/2018 | Liberstein | |
| RE47,066 | E | 10/2018 | Carlson et al. | |
| 10,813,819 | B2 | 10/2020 | Lieberstein | |
| 10,828,219 | B2 * | 11/2020 | Podolske | A61G 17/08 |
| 11,439,561 | B2 * | 9/2022 | Jacobs | A61G 17/08 |
| 2002/0073522 | A1 * | 6/2002 | Robinson | A61G 17/08<br>27/26 |
| 2004/0040129 | A1 * | 3/2004 | Ogle, II | A61G 17/007<br>27/1 |
| 2005/0055812 | A1 * | 3/2005 | Fischer | A61G 17/08<br>27/1 |
| 2009/0064546 | A1 * | 3/2009 | Larbrisseau | B44C 5/06<br>40/1 |
| 2010/0199476 | A1 * | 8/2010 | Cummings | A61G 17/0166<br>27/1 |
| 2014/0250645 | A1 * | 9/2014 | Bailey | E04H 13/001<br>27/1 |
| 2014/0259983 | A1 * | 9/2014 | Camp, Jr. | E04H 13/003<br>52/103 |
| 2015/0013124 | A1 * | 1/2015 | Bailey | E04H 13/008<br>27/1 |
| 2017/0281449 | A1 * | 10/2017 | Podolske | A61G 17/08 |
| 2020/0100975 | A1 * | 4/2020 | Jacobs | A61G 17/08 |
| 2022/0316229 | A1 * | 10/2022 | Griggs | E04H 13/003 |
| 2023/0051736 | A1 * | 2/2023 | Ebbott | A61G 17/08 |

* cited by examiner

INDOOR OUTDOOR URN

RELATED APPLICATIONS

None

FIELD OF THE INVENTION

The present invention relates generally to an urn and more specifically to an indoor outdoor urn.

BACKGROUND OF THE INVENTION

An urn is one of several important means of preserving the remains of a loved one. While many people may display an urn in their home or apartment-some prefer to have the urn placed outside. In such instances it may be difficult to secure the urn in a given surface.

Therefore, a need exists by which an urn may be safely secured in place outside or utilized indoors. The indoor outdoor urn provides a solution to the aforementioned problem in a manner which is easy and cost-effective.

SUMMARY OF THE INVENTION

The principles of the present invention provide for a cremains display which has an urn adapted to hold a plurality of cremains of a loved one and a base permanent for the urn. The base may be permanently coupled underneath the urn. The urn may include an urn wall and a top seal that defines a hollow interior.

The hollow interior of the urn may be used to insert the cremains is through a bottom aperture located on the bottom of the urn when the cremains display is inverted. The bottom aperture may be concealed by an urn plug. The urn plug may be threaded. The urn may be permanently sealed on top. The base may include a cuboid shape. The urn and the base may be displayed at an indoor venue with the base serving as a display stand for the urn. The urn and the base may be displayed at an outdoor venue with the base buried in a ground surface to serve as a footing for the urn. A plurality of stake bores and an urn access bore may pass through the base.

The urn access bore may provide access into the urn from the bottom of the base. The stake bore may provide a path for a plurality of stakes that anchor the base. The stake bore may be exposed on top of the base as a plurality of stake access apertures. The stake bores may be exposed on the bottom of the base as a plurality of stake exit apertures. The stake bores and the stake access apertures may have an equal diameter. The stake access apertures may be concealed by a plurality of stake plugs. The stake plugs may be removed to install the stakes and cover the stake access apertures at other times. The stake plugs may be removed to remove the stakes and cover the stake access apertures at other times. The stake plugs may have a plurality of threaded sides that screw into a threaded top of the stake bores.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
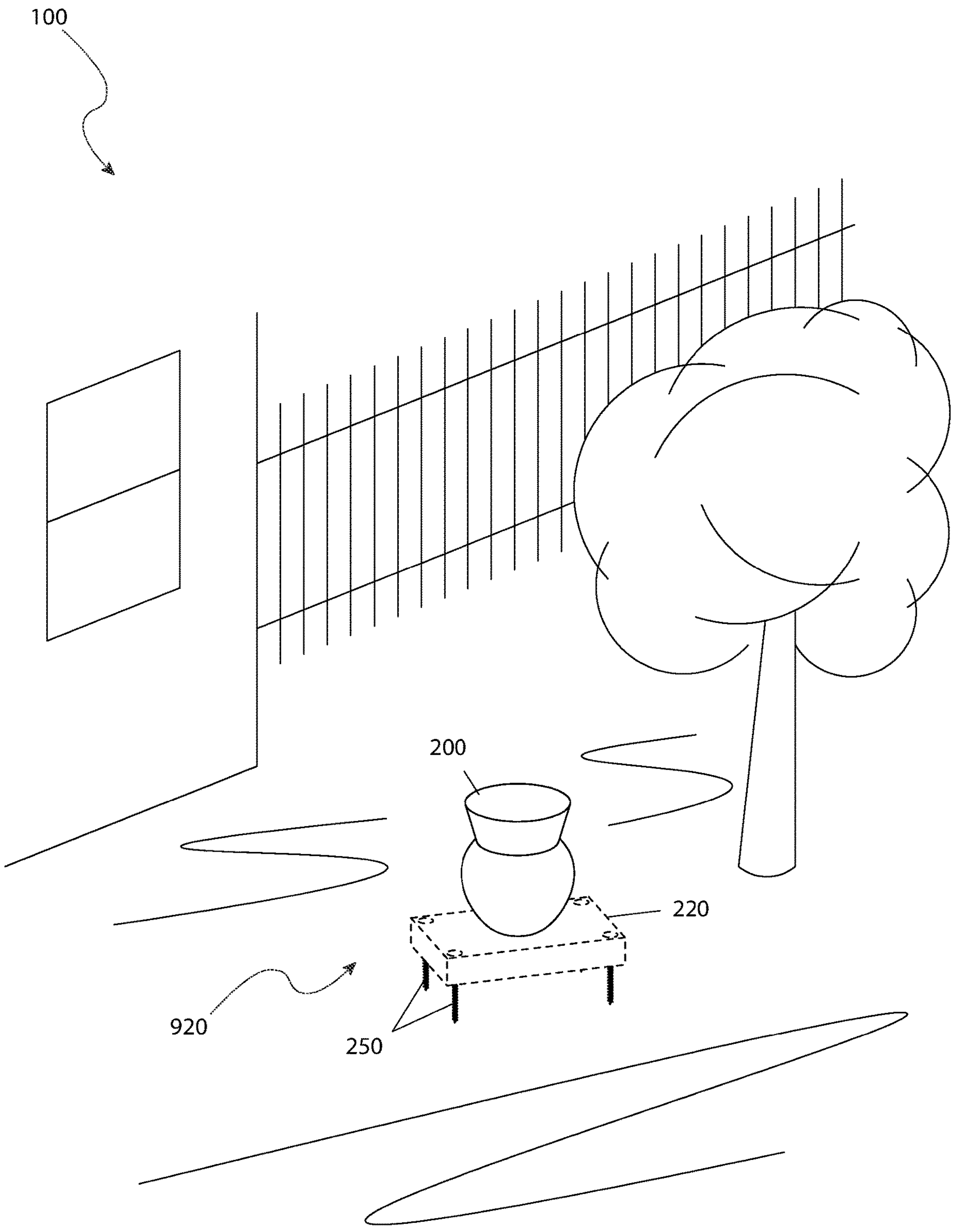
FIG. 1 is an in-use view of a cremains display, according to an embodiment of the present invention.
Figure 2:
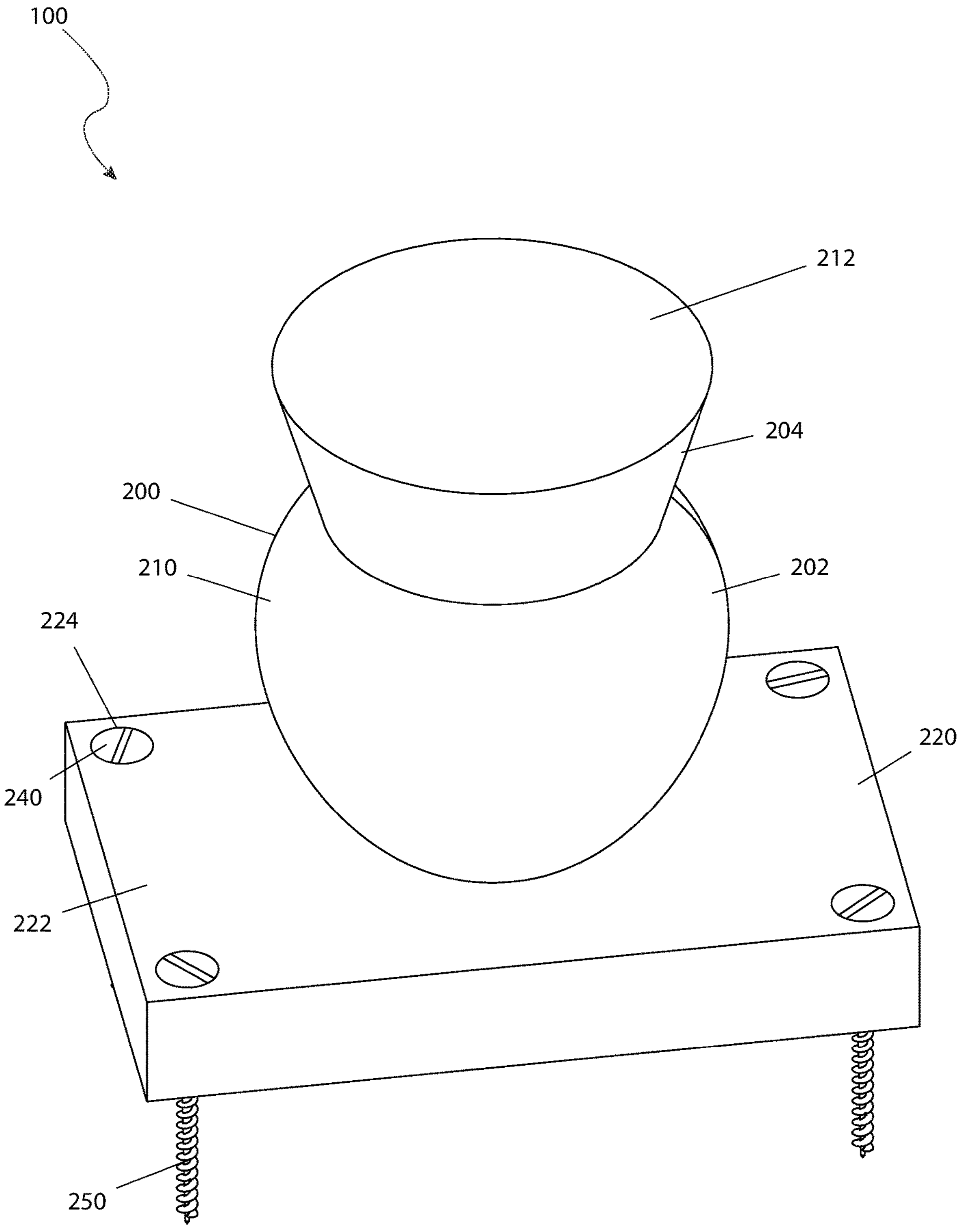
FIG. 2 is an isometric view of a cremains display, according to an embodiment of the present invention.
Figure 3:
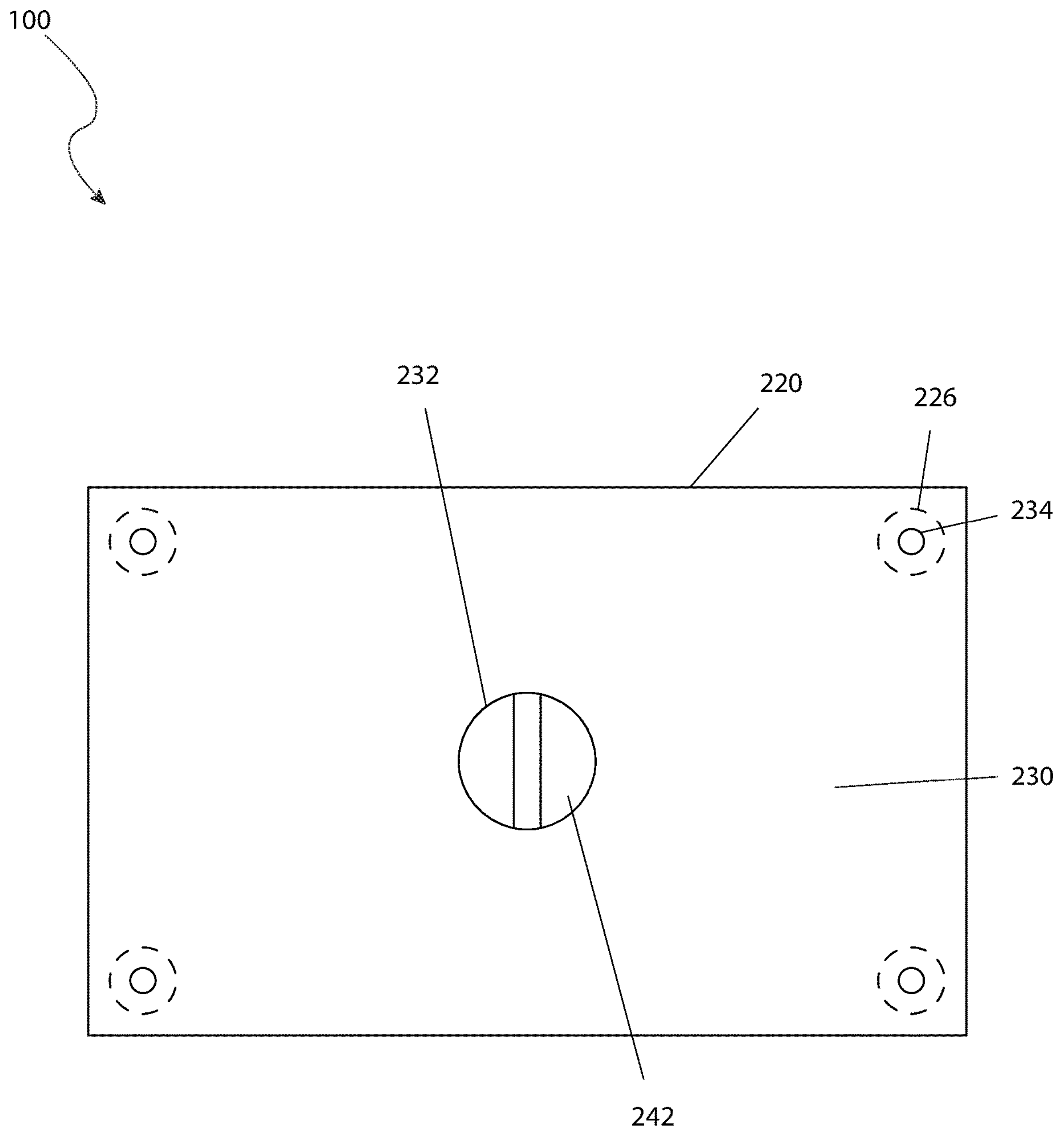
FIG. 3 is a bottom view of a cremains display, according to an embodiment of the present invention.
Figure 4:
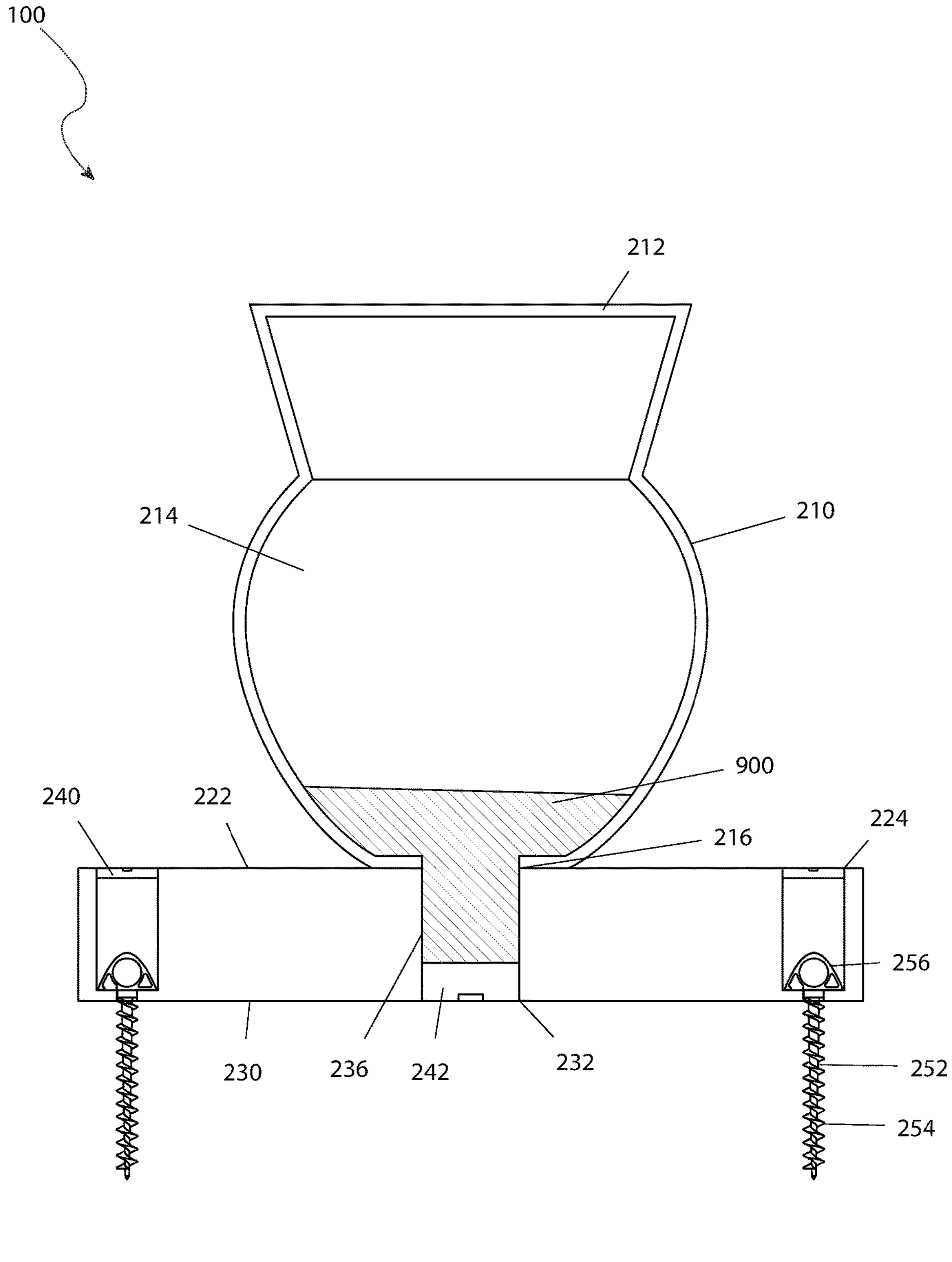
FIG. 4 is a side detail view of a cremains display, according to an embodiment of the present invention.

100 cremains display
200 urn
202 body
204 neck
210 urn wall
212 top seal
214 hollow interior
216 bottom aperture
220 base
222 top surface
224 stake access aperture
226 stake bore
230 bottom surface
232 urn access aperture
234 stake exit aperture
236 urn access bore
240 stake plug
242 urn plug
250 plurality of stakes
252 individual stake
254 shaft
256 head
900 cremains
920 outdoor venue

1. Description of the Invention

The present invention is directed to a cremains display (herein described as the "invention") 100. The invention 100 may comprise an urn 200 and a base 220. The urn 200 may be permanently coupled to the base 220. The invention 100 may be adapted to function as a memorial for a deceased loved one, such as a pet or a person. The urn 200 may be adapted to hold cremains 900 of the loved one. The urn 200 and the base 220 may be displayed at an indoor venue with the base 220 serving as a display stand for the urn 200. The urn 200 and the base 220 may be displayed at an outdoor venue 920 with the base 220 buried in the ground to serve as a footing for the urn 200.

The urn 200 may be a decorative container for holding the cremains 900. As a non-limiting example, the urn 200 may present a body 202 and a neck 204 in the form of a vase. The body 202 may be a round, bulbous shape. The urn 200 may comprise an urn wall 210 and a top seal 212 that may define a hollow interior 214. The urn 200 may be permanently sealed on top. Access to the hollow interior 214 of the urn 200 to insert the cremains 900 may be through a bottom aperture 216 located on the bottom of the urn 200 when the invention 100 is inverted.

The base 220 may be a platform for supporting the urn 200. The base 220 may be the shape of a cuboid. When displayed indoors, the base 220 may serve as a display stand for the urn 200. When displayed outdoors, the base 220 may be buried to retain the urn 200 at a specific location.

A plurality of stake bores 226 and an urn access bore 236 may pass through the base 220 from top to bottom. The plurality of stake bores 226 may provide a path for a plurality of stakes 250 that may anchor the base 220. The urn access bore 236 may provide access into the urn 200 from the bottom of the base 220.

The plurality of stake bores 226 may be exposed on a top surface 222 of the base 220 as a plurality of stake access apertures 224. The plurality of stake bores 226 may be exposed on a bottom surface 230 of the base 220 as a plurality of stake exit apertures 234. The plurality of stake bores 226 and the plurality of stake access apertures 224 may be the same diameter. The diameters of the plurality of stake bores 226 and the plurality of stake access apertures 224 may be larger than the diameter of a head 256 of an individual stake 252 selected from the plurality of stakes 250 such that the head 256 may pass through the plurality of stake bores 226. The plurality of stake exit apertures 234 may be a smaller diameter than the diameter of the plurality of stake access apertures 224. The diameter of the plurality of stake exit apertures 234 may be larger than the diameter of a shaft 254 of the individual stake 252 such that the shaft 254 of the plurality of stakes 250 may exit through the bottom of the plurality of stake bores 226. The diameter of the plurality of stake exit apertures 234 may be smaller than the diameter of the head 256 of the individual stake 252 such that the head 256 of the plurality of stakes 250 may not pass through the plurality of stake bores 226.

The plurality of stake access apertures 224 may be concealed by a plurality of stake plugs 240. The plurality of stake plugs 240 may be removed to install or remove the plurality of stakes 250 and may cover the plurality of stake access apertures 224 at other times. As non-limiting examples, the plurality of stake plugs 240 may have threaded sides that may screw into a threaded top of the plurality of stake bores 226.

The urn access bore 236 may be exposed on the bottom surface 230 of the base 220 as an urn access aperture 232. The urn access bore 236 may be open from the urn access aperture 232 to the hollow interior 214 of the urn 200. The cremains 900 may be placed into the urn 200 by pouring the cremains 900 into the urn access aperture 232 while the invention 100 is inverted.

The urn access aperture 232 may be concealed by an urn plug 242. The urn plug 242 may be removed to insert or remove the cremains 900 and may cover the urn access aperture 232 at other times. As non-limiting examples, the urn plug 242 may have threaded sides that may screw into a threaded bottom of the urn access bore 236. In some embodiments, the plurality of stake plugs 240, the urn plug 242, or both may be slotted for tightening and loosening using a screwdriver or other tool.

The plurality of stakes 250 may be operable to anchor the base 220 when the invention 100 is placed at the outdoor venue 920. The individual stake 252 selected from the plurality of stakes 250 may comprise the head 256 and the shaft 254 which may be threaded. The shaft 254 may be operable to pull the individual stake 252 down into the ground. The head 256 may be operable to pull the base 220 down with the shaft 254. As a non-limiting example, the plurality of stakes 250 may be inserted into the plurality of stake bores 226 through the plurality of stake access apertures 224 when the plurality of stake plugs 240 are removed and may be twisted into the ground. The plurality of stake plugs 240 may be replaced to conceal the plurality of stake bores 226.

In use, the invention 100 may be inverted and the urn plug 242 may be removed to reveal the urn access aperture 232 and the urn access bore 236. The cremains 900 may be poured into the urn access aperture 232 and may fall through the urn access bore 236 into the urn 200. The urn plug 242 may be installed to retain the cremains 900. The invention 100 may be displayed at an indoor venue by placing the invention 100 in a display area such that the urn 200 is visible and the base 220 acts as a display stand. The invention 100 may be displayed at an outdoor venue 920 by burying the base 220 such that the bottom of the urn 200 is at ground level and by using the plurality of stakes 250 passing through the plurality of stake bores 226 to retain the base 220. The plurality of stakes 250 may be installed by removing the plurality of stake plugs 240, inserting the plurality of stakes 250 and twisting the shafts 254 into the ground below the base 220, and by replacing the plurality of stake plugs 240.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A cremains display, comprising:
an urn adapted to hold a plurality of cremains of a loved one;
a plurality of removable stakes;
a base permanently coupled to the urn, wherein the base further comprises:
a plurality of stake bores provide a path for the plurality of stakes used to anchor the base;
an urn access bore that passes through the base and provides access into the urn from a bottom of the base; and
a plurality of removable stake plugs configured to be inserted into the respective plurality of stake bores cover the plurality of stake bores and configured to be removed from the respective plurality of stake bores for installation and removal of the plurality of stakes.

2. The cremains display, according to claim 1, wherein the base is permanently coupled underneath the urn.

3. The cremains display, according to claim 1, wherein the urn includes an urn wall and a top seal that defines a hollow interior.

4. The cremains display, according to claim 3, wherein access to the hollow interior of the urn to insert the cremains is through a bottom aperture located on the bottom of the urn when the cremains display is inverted.

5. The cremains display, according to claim 4, wherein the bottom aperture is concealed by an urn plug.

6. The cremains display, according to claim 5, wherein the urn plug is threaded.

7. The cremains display, according to claim 1, wherein the urn is permanently sealed on top.

8. The cremains display, according to claim 1, wherein the base includes a cuboid shape.

9. The cremains display, according to claim 1, wherein the urn and the base are displayed at an indoor venue with the base serving as a display stand for the urn.

10. The cremains display, according to claim 1, wherein the urn and the base are displayed at an outdoor venue with the base buried in a ground surface to serve as a footing for the urn.

11. The cremains display, according to claim 1, wherein the stake bores are exposed on top of the base as a plurality of stake access apertures.

12. The cremains display, according to claim 1, wherein the stake bores are exposed on the bottom of the base as a plurality of stake exit apertures.

* * * * *